(12) United States Patent
Tomono et al.

(10) Patent No.: US 6,169,750 B1
(45) Date of Patent: Jan. 2, 2001

(54) VOICE PACKET MULTIPLEXER WITH VOICE TRANSIT SWITCHING FUNCTION

(75) Inventors: Takamasa Tomono, Tokyo; Nobuki Sato, Saitama; Shuhei Kokubun, Tokyo; Makoto Aoki, Tokyo; Junichi Kii, Tokyo, all of (JP)

(73) Assignee: Logic Corporation, Tokyo ( * ) Notice: Under 35 U.S.C. 154(b), the term of this patent shall be extended for 0 days.

(21) Appl. No.: 09/093,650

(22) Filed: Jun. 9, 1998

(30) Foreign Application Priority Data

Jun. 10, 1997 (JP) .................................................... 9-152569

(51) Int. Cl.[7] ........................................................ H04J 3/24
(52) U.S. Cl. ............................................. 370/474; 370/252
(58) Field of Search ..................................... 370/252, 464, 370/465, 474, 389, 390, 235, 236

(56) References Cited

U.S. PATENT DOCUMENTS 4,611,322 * 9/1986 Larson .................................. 370/232
5,379,293 * 1/1995 Kanno .................................. 370/389
5,675,574 * 10/1997 Norizuki .............................. 370/230

* cited by examiner

Primary Examiner—Douglas W. Olms
Assistant Examiner—Ricardo M. Pizarro
(74) Attorney, Agent, or Firm—Ostrolenk, Faber, Gerb & Soffen, LLP (57) ABSTRACT

A voice packet multiplexer with a voice transit switching function, which is connected to a PBX in an office. It detects an originating logical channel according to digits sent from the PBX, and sets, when transmitting a signal packet or voice packet, the detected originating logical channel in its address field. It also stores an originating logical channel while receiving a packet from a packet communication network. It further extracts an office number from a received packet containing the digit information, makes a decision whether the office number is the number of its own office or of another office, and retrieves, if it is of the another office, a terminating logical channel for establishing connection with that office. To carry out the voice transit switching after determining the terminating logical channel, it transmits a packet after translating its address field into the terminating logical channel or into the originating logical channel.

3 Claims, 10 Drawing Sheets

VOICE PACKET MULTIPLEXER WITH VOICE TRANSIT SWITCHING FUNCTION

This application is based on Patent Application No. 152,569/1997 filed on Jun. 10, 1997 in Japan, the content of which is incorporated hereinto by reference.

BACKGROUND OF THE INVENTION

1. Field of the Invention

The present invention relates to a voice packet multiplexer that transmits to a network voices sent from a PBX (private branch exchange) after packet multiplexing them, and that transmits to the PBX voices obtained by receiving packet multiplexed voices from the network and disassembling them.

2. Description of the Related Art

Figure 1:
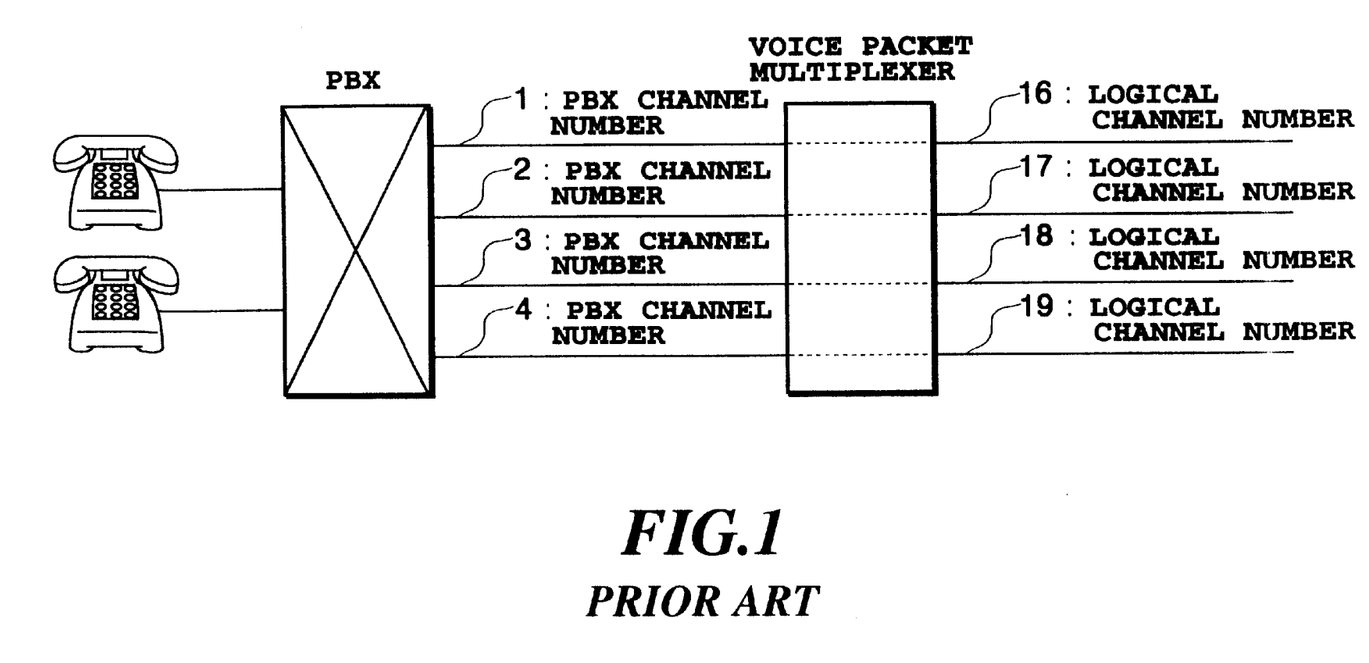
FIG. 1 is a block diagram showing the correspondence between PBX channels and network logical channels.

Although the voice packet protocol is ruled in the ITU-T standard, the path control procedure between the voice packet multiplexers has not yet been determined. This presents some problems:

First, since a voice packet multiplexer, although connected to a PBX, is not provided with a routing function of packets, channels between the PBX and voice packet multiplexer must be connected with logical channels of a packet network on a one-to-one basis. Such a configuration is shown in FIG. 1, which illustrates that four channels extending from a PBX correspond to four logical channels of a packet network. Here, although the number of the logical channels of the packet network is shown by multiple lines in FIG. 1, they are actually only a single line physically.

The configuration as shown in FIG. 1 must comprise between the PBX and voice packet multiplexer the same number of channels as that of logical channels between the office and party offices. The number of simultaneous use of the logical channels, however, is usually less than the total number of the logical channels because it is rare that all the offices use the logical channels at the same time, which must be taken into account when deciding the number of the channels of the PBX.

Thus, the conventional system has a drawback that more than necessary channels must be installed between the PBX and voice packet multiplexer, and this increases the cost.

Second, in the voice packet communication, time periods required for voice packets to be assembled by the voice packet multiplexer and transmitted to the next voice packet multiplexer through packet communication channels differ from packet to packet, which will be referred to as a "delay fluctuation" below. Accordingly, the voice packet multiplexer that receives the voice packets must cancel the delay fluctuations before reproducing the voices from them. To achieve this, it carries out such control that it once stores the voice packets in a memory, and adds delays to them before reproduction. This control will be called "delay fluctuation cancellation" from now on.

Furthermore, in the voice packet communication, the voices are compressed using a highly efficient encoding scheme when assembling the voice packets, and are expanded when disassembling the compressed voice packets. Repeating the compression and expansion through the highly efficient encoding scheme, however, will impair the fidelity of the reproduced voices as compared with the original voice, thereby degrading the articulation.

Figure 2:
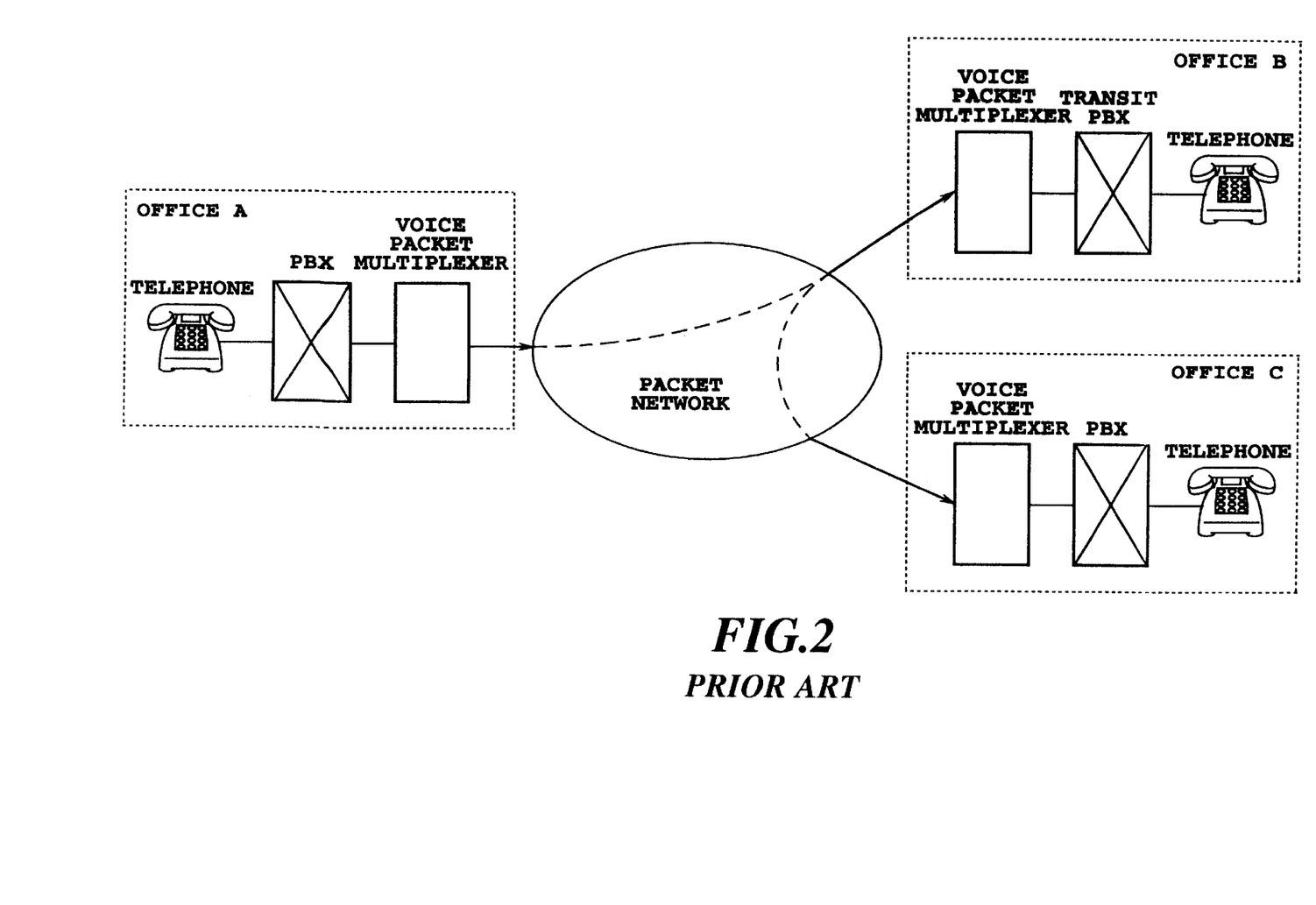
FIG. 2 is a block diagram showing a network configuration using conventional packet multiplexers.
Figure 3:
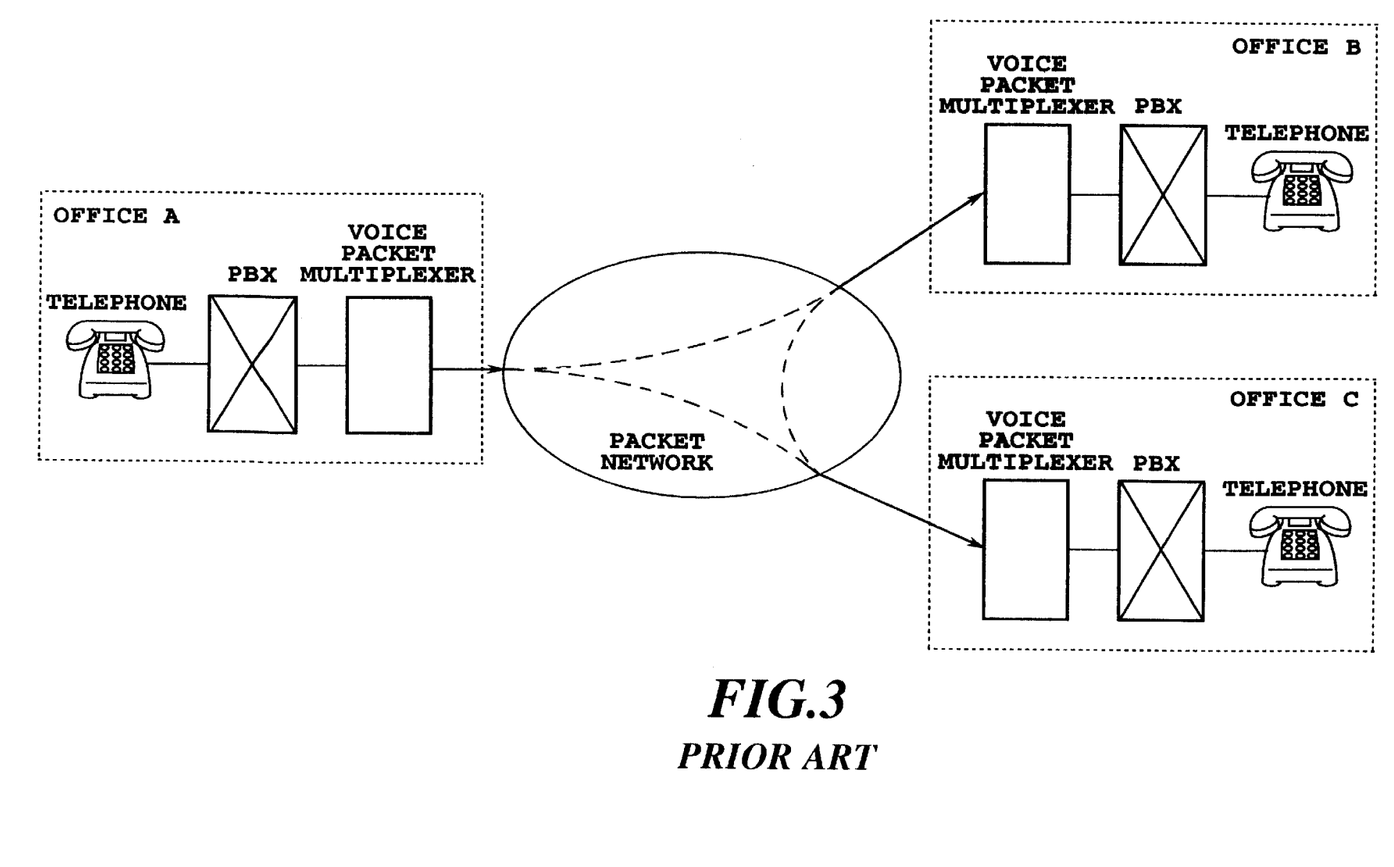
FIG. 3 is a block diagram showing another network configuration using the conventional packet multiplexers.

Third, the conventional voice packet multiplexers have a problem when they are employed in such a configuration as shown in FIG. 2, where an office A is connected with an office B through a leased line, the office B is connected with an office C through another leased line, and the voice packet multiplexers interconnect them.

When the office A communicates with the office C in such a system, a transit PBX is connected to the terminal side of the voice packet multiplexer in the office B, so that the transit PBX repeats the communication. Thus, in the configuration as shown in FIG. 2, the voice packet multiplexer in the office B carries out the delay fluctuation cancellation, while expanding the voice compressed through the highly efficient encoding scheme, sending it to the PBX and receiving it from the PBX, and compressing it again using the highly efficient encoding scheme, and then transmits it to the office C.

Such a configuration that passes the voice packets through the transit PBX has a problem of increasing the delay of the voice communication which demands the immediacy, because of the delay fluctuation cancellation carried out by the voice packet multiplexer connected to the transit PBX. Besides, an increasing number of compression and expansion processings using the highly efficient encoding scheme causes the reduction in the articulation of the reproduced voice.

Moreover, the transit PBX demands an additional cost for implementing the repeating function, and requires for transit channels to be assigned when determining the number of channels between the PBX and the voice packet multiplexer, which will prevent an efficient use of the PBX channels.

In view of this, a leased line interconnecting the offices A and C directly without passing through the office B can be installed to carry out communications between them. In this case, however, a problem arises of paying a charge for using the leased line.

SUMMARY OF THE INVENTION

It is therefore an object of the present invention to provide a novel voice packet multiplexer for eliminating the foregoing problems involved in the conventional voice packet multiplexer.

In a first aspect of the present invention, there is provided a voice packet multiplexer which is connected with a PBX (private branch exchange), carries out packet multiplexing of voices and signals sent from the PBX to be sent to a packet communication channel, and disassembles a packet sent from a packet communication channel into voices and signals to be transmitted to the PBX, the voice packet multiplexer comprising:

digit detector for detecting digits in the signals sent from the PBX;

a logical channel retriever for retrieving a terminating logical channel according to the digits output from the digit detector;

a voice packet assembler for assembling a packet from the terminating logical channel and the voices sent from the PBX; and a signal packet assembler for assembling a packet from the terminating logical channel and the signals sent from the PBX.

The present invention enables the efficient use of the channels of the PBX because it retrieves the logical channel from the digit information received from the PBX, and sets the retrieved logical channel in the address field of the voice packet when sending the signal packet or voice packet.

The voice packet multiplexer may further comprise:

a packet storage for storing the packet sent from the packet communication channel;

an originating logical channel detector for detecting an originating logical channel in a packet sent from an originating terminal; and an address translator for translating, when transmitting the packet stored in the packet storage to the packet communication channel, an address field in the packet.

In this way, the present invention achieves a voice transit switching function that stores the originating logical channel of the calling terminal, which is retrieved from the received packet; retrieves the terminating logical channel of the called terminal by extracting the digit information; and translates, when transmitting the stored packet after the terminating logical channel has been established, the address field of the packet into the terminating logical channel if contains the originating logical channel, and the address field of the packet into the originating logical channel if it contains the terminal logical channel.

This makes it possible to reduce the delay time of the voice, increase the articulation of the reproduction voice, obviate the transit PBX, and remove the unnecessary logical channels between the voice packet multiplexers, thereby improving the speech quality and reducing the cost involved in installation and service.

The above and other objects, effects, features and advantages of the present invention will become more apparent from the following description of the embodiment thereof taken in conjunction with the accompanying drawings.

DETAILED DESCRIPTION OF PREFERRED EMBODIMENT

The invention will now be described with reference to the accompanying drawings.

Figure 4:
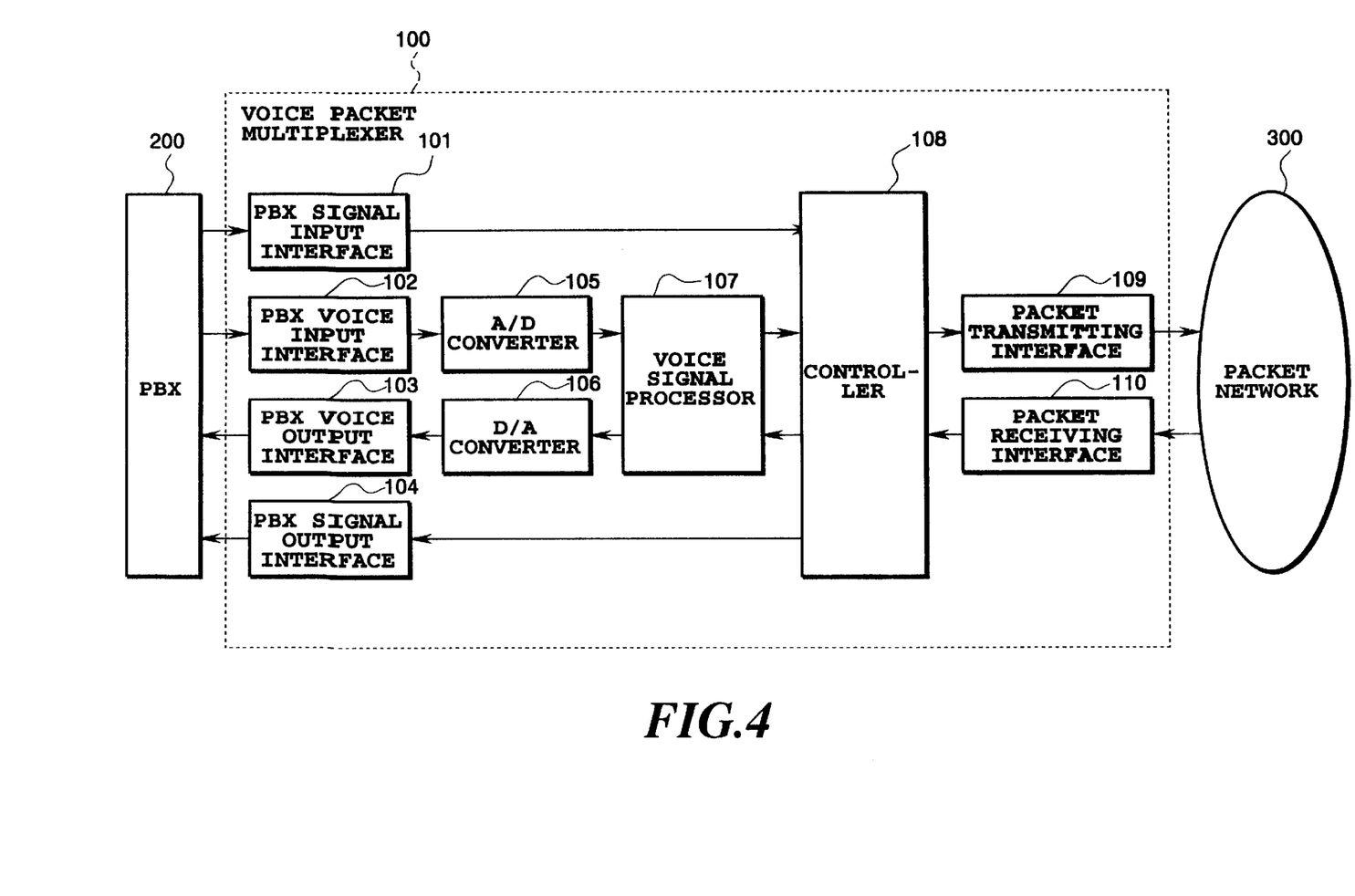
FIG. 4 is a block diagram showing an embodiment of a voice packet multiplexer in accordance with the present invention.

FIG. 4 is a block diagram showing a configuration of a voice packet multiplexer for implementing the present invention.

In FIG. 4, the reference numeral 100 designates a voice packet multiplexer which implements the present invention, and is interconnected with a PBX (private branch exchange) and a packet network 300. It transfers to the packet network 300 voice signals and the like in the form of digital packets sent from the PBX 200, whereas transfers to the PBX 200 packets sent from the packet network 300 after converting them into signals equivalent to those on a common telephone network. The voice packet multiplexer 100 is connected to the PBX 200 through a PBX signal input interface 101, PBX voice input interface 102, PBX voice output interface 103 and PBX signal output interface 104, and is connected to the packet network 300 through a packet transmission interface 109 and packet reception interface 110.

The PBX signal input interface 101 and the PBX signal output interface 104 exchange with the PBX 200 PBX signals such as a seizure signal, digits and an answer signal. On the other hand, the voice input interface 102 and the voice output interface 103 exchange with the PBX 200 the voice signals.

The voice signal received by the voice input interface 102 is converted into a digital signal by an A/D converter 105, and is supplied to a voice signal processor 107. The voice signal processor 107 extracts from the voice signal speech spurts in which the significant voice signal is present, and supplies them to a controller 108 after compression. The voice signal processor 107 also expands compressed voice output from the controller 108, and supplies it to a D/A converter 106. Thus, the voice signal processor 107 carried out the processing of the voice signal. The voice signal processor 107 can be constructed using a DSP (digital signal processor).

The digitalized voice signals and PBX signals are input to the controller 108 to be assembled into packets. Reversely, packets fed from the packet network are disassembled into the voice signals and the PBX signals by the controller 108. The controller 108 can also be constructed using the DSP or a general purpose processor.

The signal processings in the controller 108 will now be described in detail referring to a functional block diagram in FIG. 5, sequence charts in FIGS. 6 and 7, and a flowchart in FIG. 8.

Figure 5:
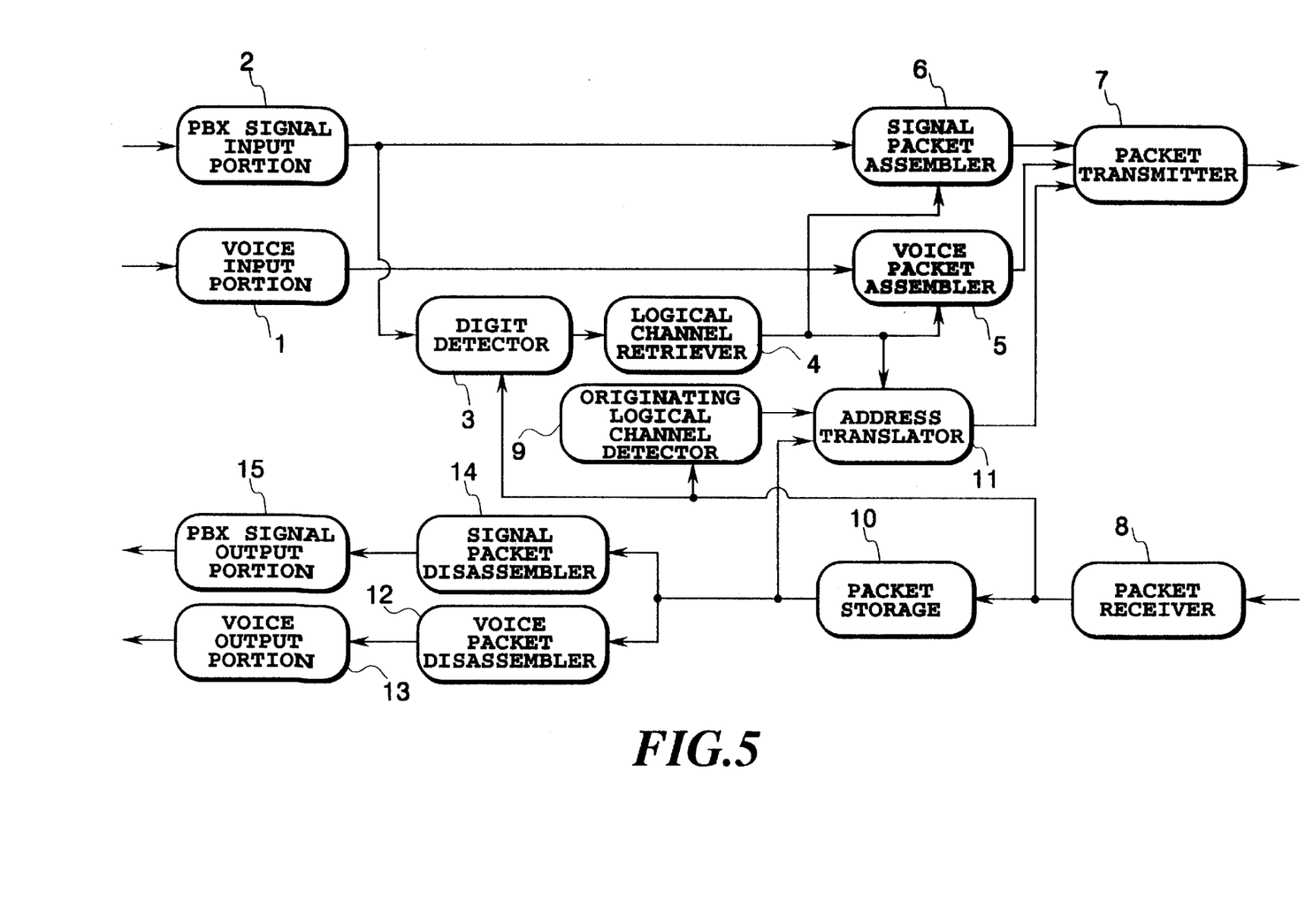
FIG. 5 is a functional block diagram illustrating the signal processings of the embodiment of the voice packet multiplexer in accordance with the present invention.

FIG. 5 is a functional block diagram illustrating the signal processings up to the controller 108 in FIG. 4.

In FIG. 5, the reference numeral 1 designates a voice input portion for receiving voices output from the voice signal processor 107; 2 designates a PBX signal input portion for receiving control signals output from the PBX 200; 3 designates a digit detector for detecting the digits (address signal) in the signals which are sent from the PBX 200 and received by the PBX signal input portion 2, or in the packet which are received by a packet receiver 8; 4 designates a logical channel retriever for retrieving a terminating logical channel according to the digits output from the digit detector 3; and 5 designates a voice packet assembler for assembling voice packets from the voice signal output from the voice input portion 1 and the logical channel output from the logical channel retriever 4.

The reference numeral 6 designates a signal packet assembler for assembling signal packets from the signals supplied from the PBX signal input portion 2 and the logical channel fed from the logical channel retriever 4; 7 designates a packet transmitter for transmitting to a packet communication channel the voice packets assembled by the voice packet assembler 5, the signal packets assembled by the signal packet assembler 6 and packets whose addresses are translated by an address translator 11; 8 designates the packet receiver for receiving packets from a packet communication channel; 9 designates an originating logical channel detector for detecting the originating logical channel in the packet received by the packet receiver 8; and 10 designates a packet storage for temporarily stores the packets received by the packet receiver 8. The reference numeral 11 designates the address translator for translating, when the address field of the packet stored in the packet storage during the voice transit switching is the originating logical address, the address field of the packet into the terminating logical channel, and for translating it, when it is the terminating logical channel, into the originating logical channel. The reference numeral 12 designates a voice packet disassembler for selecting, if the voice transit switching is not carried out, the voice packet from among the packets stored in the packet storage to reproduce the voice; 13 designates a voice output portion for supplying the voice signal processor 107 with the voice output from the voice packet disassembler 12; 14 designates a signal packet disassembler for selecting, when the voice transit switching is not carried out, the signal packet from among the packets stored in the packet storage to disassemble the signal packet into the PBX signals; and 15 designates a PBX signal output portion for supplying the PBX 200 with the signals output from the signal packet disassembler 14.

These blocks operate under the control of the controller 108 that controls the entire blocks. The digit detector 3, logical channel retriever 4 and originating logical channel detector 9 operate only in the initial stage, in which the digits are output.

Next, the operation of the embodiment with such a configuration will be described with reference to the sequence charts shown in FIGS. 6 and 7. Here, the offices A and B in FIG. 6 correspond to those of FIG. 2, and the offices A, B and C correspond to those of FIG. 2.

A sequence of a call from a telephone in the office A to a telephone in the office B will now be described with reference to FIG. 6.

First, the sequence will be described up to transmitting a digit packet from the voice packet multiplexer of the office A to that of the office B.

When a caller in the office A goes off-hook, the off-hook information is transmitted from the telephone to the PBX (101). Receiving the off-hook information, the PBX returns a dial tone to the telephone (102). Confirming the dial tone, the caller dials the special service code of the leased line, the office number of the office B and the extension number in the office B (104, 106, 107 and 113). The PBX 200 selects, when receiving the special service code of the leased line, one of available channels of the leased line to which the voice packet multiplexer is to be connected, sends a seizure signal to the voice packet multiplexer (103), and waits for a proceed-to-send signal from the voice packet multiplexer 100. Receiving the seizure signal from the PBX 200, the voice packet multiplexer 100 sends the proceed-to-send signal (dial tone or wink) to the PBX 200 (105). These operations are carried out by the PBX signal input portion 2 and PBX signal output portion 15 under the controller 108 of the voice packet multiplexer 100.

Receiving the proceed-to-send signal, the PBX 200 sends to the voice packet multiplexer 100 the digits of the office B and the extension number in that office excluding the special service code of the leased line (108, 114 and 117). The voice packet multiplexer 100, when receiving the office number of the office B, selects a logical channel for the office B according to the office number. Then, it transmits a call request packet to the office B (109), and waits for the arrival of a call accepted packet from the office B. These operations are carried out by the controller 108 using the PBX signal input portion 2, digit detector 3, logical channel retriever 4, signal packet assembler 6 and packet transmitter 7.

Receiving the call accepted packet from the office B (111), the voice packet multiplexer 100 sends to the office B a digit packet of the extension number of the telephone in that office (115 and 118). The operation is carried out by the controller 108 using the packet receiver 8, signal packet assembler 6 and packet transmitter 7 of FIG. 2.

Second, the sequence will be described up to receiving the digit packet in the office B. This is carried out by the voice packet multiplexer 100 in the office B.

When the voice packet multiplexer 100 in the office B receives the call request packet from the office A (109), it selects one of available channels of the PBX 200 of the office B, and sends a terminating signal to the PBX 200 (110), and the call accepted packet to the office A (111). Subsequently, when it receives from the office A the digit packet of the extension number (115 and 118), it temporarily stores the digits, and waits for the arrival of the proceed-to-send signal from the PBX 200 in the office B. Receiving the proceed-to-send signal from the PBX 200 (112), it transmits the stored digits to the PBX 200 (116 and 119). Thus, the PBX 200 receives the digits from the voice packet multiplexer 100 until the extension number is determined.

These operations are carried out by the packet receiver 8, packet storage 10, signal packet disassembler 14, PBX signal output portion 15, PBX signal input portion 2, signal packet assembler 6 and packet transmitter 7 in the voice packet multiplexer 100 in the office B.

So far is the sequence up to the transmission of the digits from the office A to the office B.

Once the extension number has been fixed, the PBX 200 in the office B sends to the telephone a ringing (120), and to the voice packet multiplexer 100 a ringing tone (121). Since the ringing tone is audible, it is packetized by the voice packet multiplexer 100 in the office B to be sent to the office A (122). These operations are carried out in the voice input portion 1, voice packet assembler 5 and packet transmitter 7.

This packet is disassembled and reproduced by the voice packet multiplexer 100 in the office A so that the caller can hear it (123 and 124). This operation is carried out by the packet receiver 8, packet storage 10, voice packet disassembler 12 and voice output portion 13.

When the terminating terminal answers, the off-hook information is transferred in the office B from the telephone to the voice packet multiplexer 100 through the PBX 200 (125 and 126). Thus, the off-hook information is transmitted in the form of an answer packet to the voice packet multiplexer 100 in the office A (127), and is transferred to its PBX 200 as an answer signal (128). Then, an acknowledge packet, a control packet for confirming that the answer packet is transferred between the voice packet multiplexers, is sent (129). These operations are carried out in the PBX signal input portion 2, signal packet assembler 6 and packet transmitter 7 in the voice packet multiplexer 100 of the office B, and in the packet receiver 8, packet storage 10, signal packet disassembler 14, PBX signal output portion 15, signal packet assembler 6 and packet transmitter 7 in the voice packet multiplexer 100 of the office A.

When a conversation begins, its messages are transferred by means of the packets between the telephones in the offices A and B (130–134). This operation is carried out in the voice input portion 1, voice packet assembler 5, packet transmitter 7, packet receiver 8, packet storage 10, voice packet disassembler 12 and voice output portion 13.

So far is the description of the sequence when connecting two sites using the PBXs through the voice packet multiplexers.

Next, the sequence will be described with reference to FIG. 7 when calling the telephone in the office C from the office A in a configuration as shown in FIG. 2, in which the offices A and B are interconnected through a leased line, and the offices B and C are interconnected through another leased line, and the leased lines are interconnected through the voice packet multiplexers. In this case, the voice transit switching function in the voice packet multiplexers is used.

Figures 6, 6A:
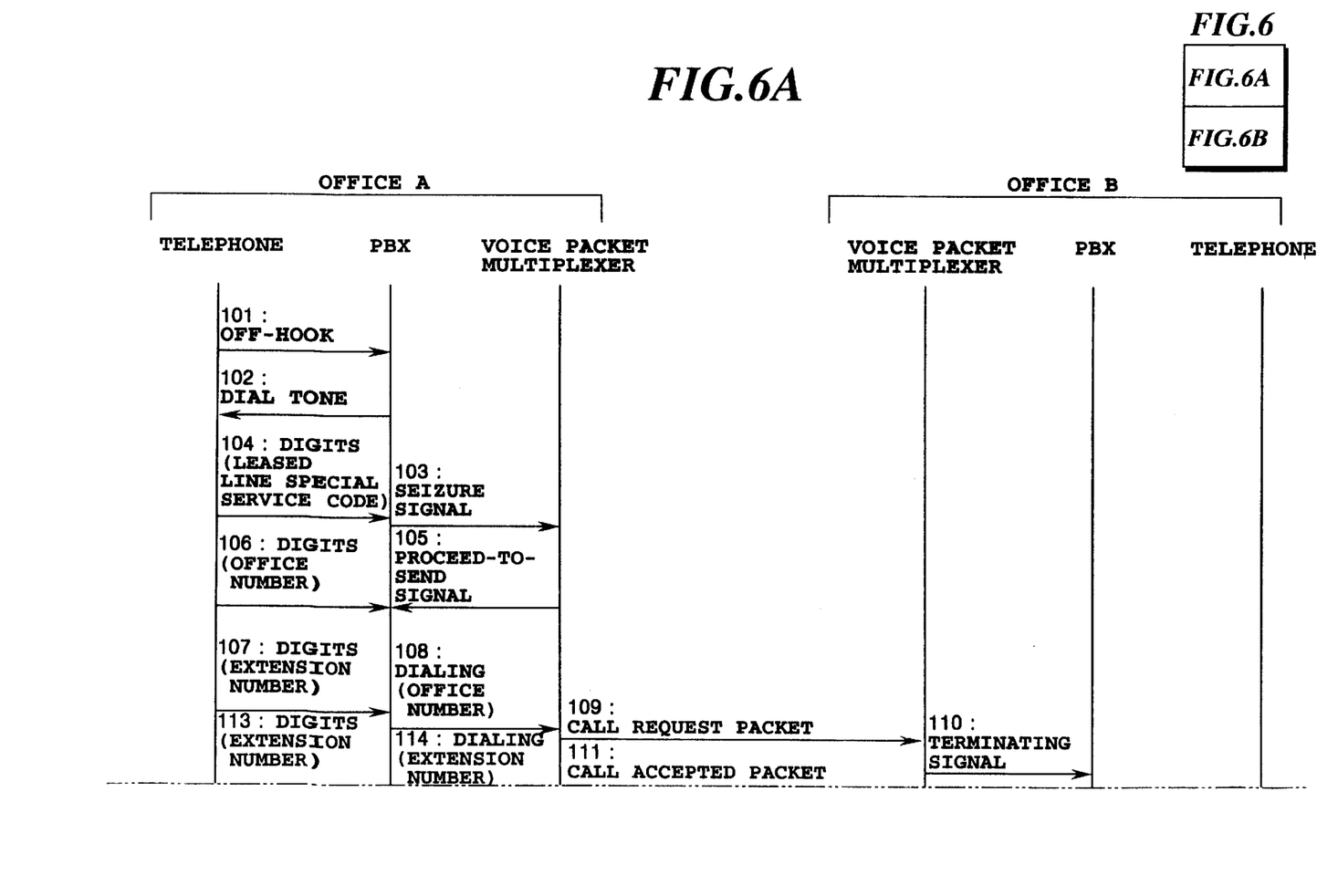
FIG. 6 shows that FIG. 6A and FIG. 6B form one complete diagram.
FIGS. 6A and 6B are sequence diagrams when two offices are interconnected in the embodiment.
Figure 6B:
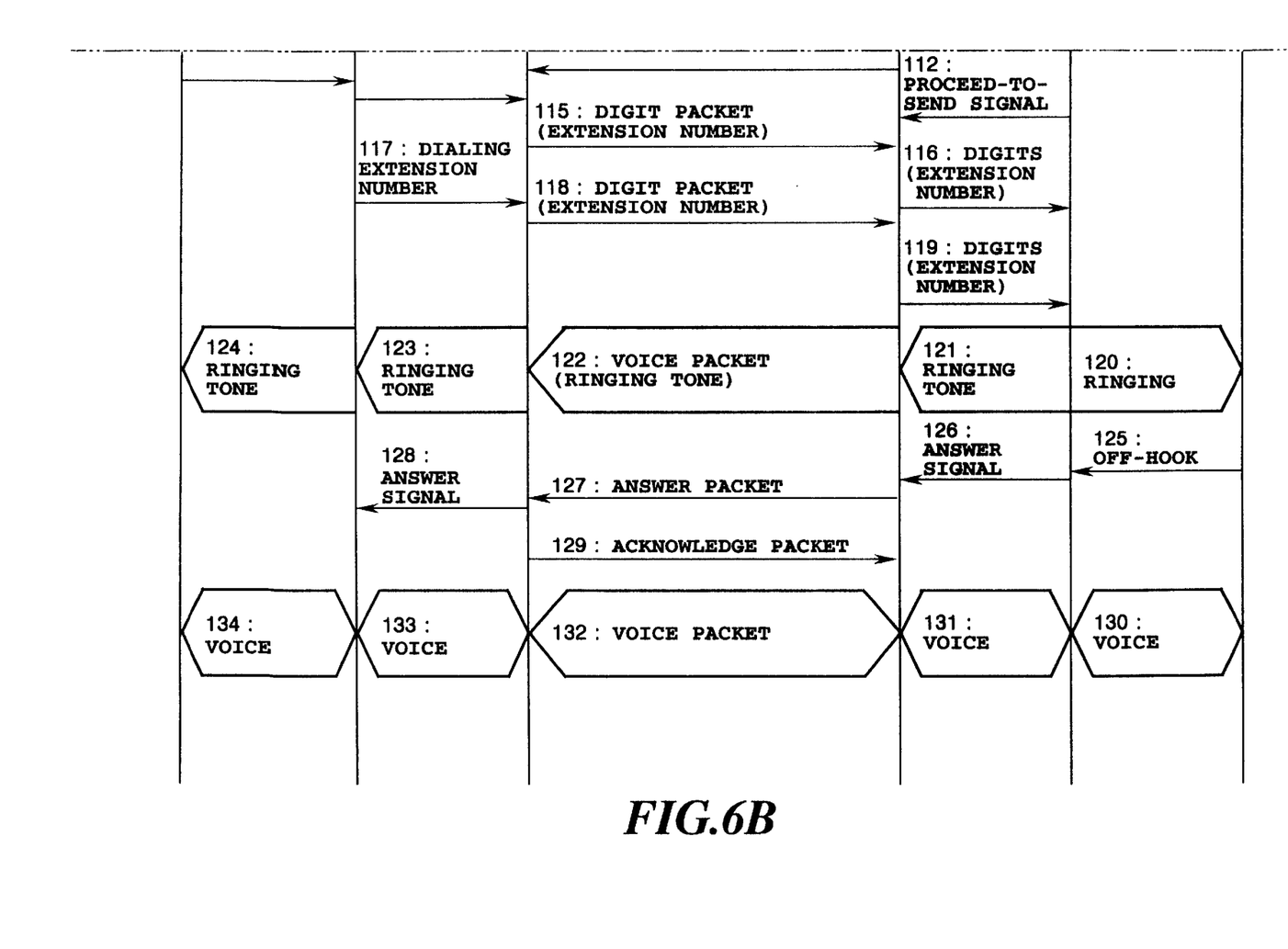
Figures 7, 7A:
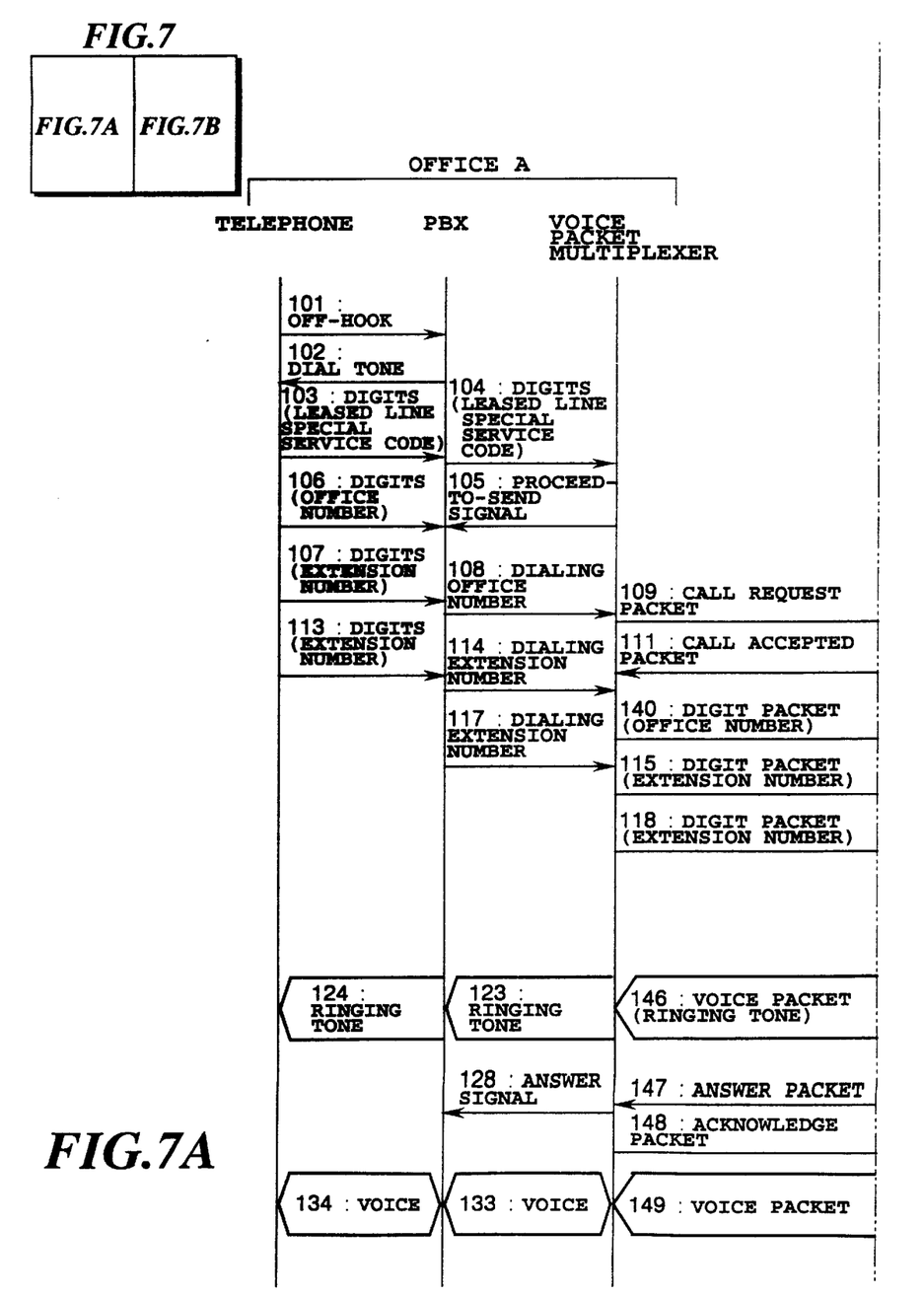
FIG. 7 shows that FIG. 7A and FIG. 7B form one complete diagram.
FIGS. 7A and 7B are sequence diagrams when a transit connection is carried out in the embodiment.
Figure 7B:
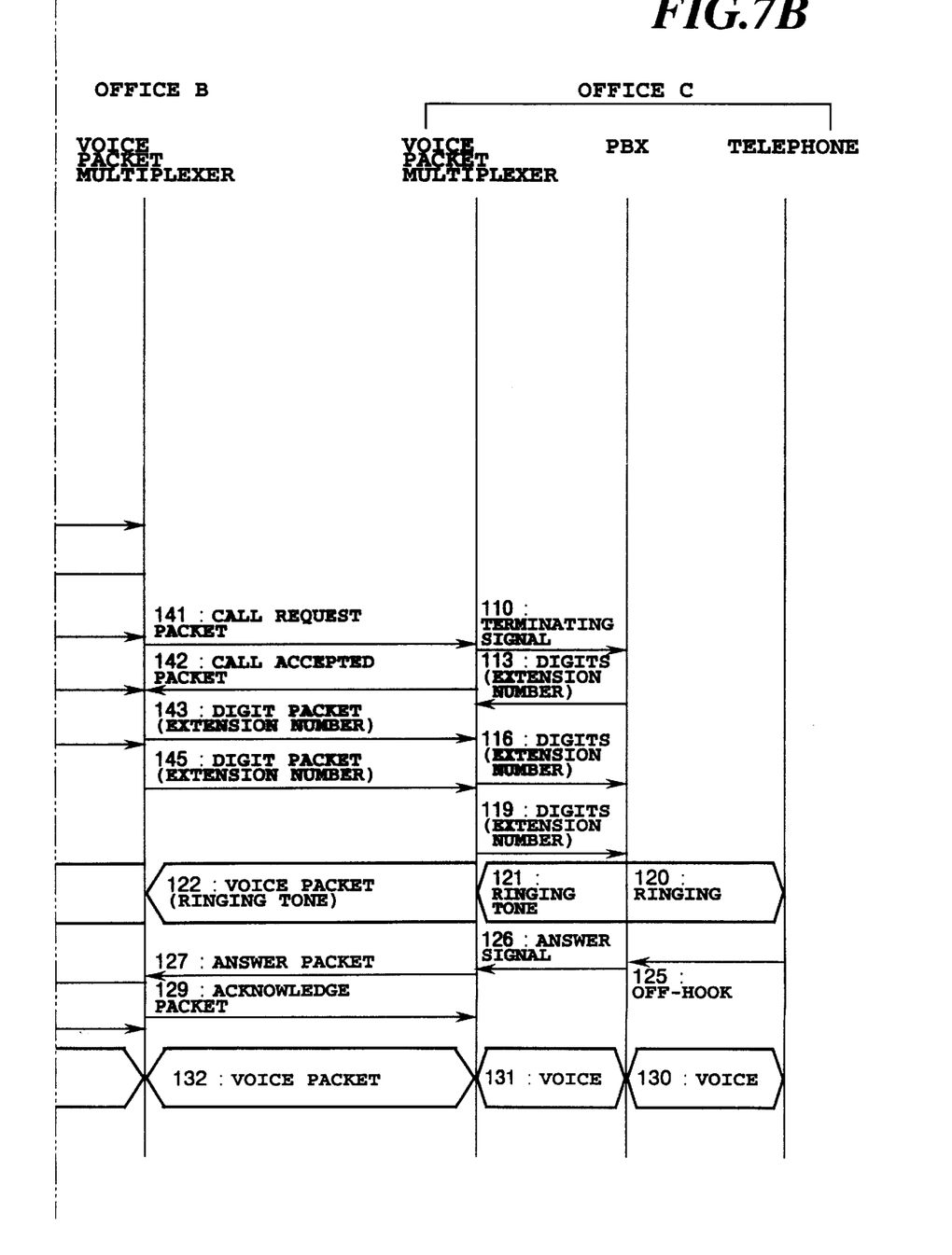

In the sequences of FIGS. 6 and 7, the same operations are designated by the same reference numerals. In addition, since the sequence up to the transmission of the call accepted packet (111) by the office B is the same as that of FIG. 6, the description thereof is omitted here.

The voice packet multiplexer 100 in the office A can detect by the digit detector 3 and logical channel retriever 4 that the voice transit switching function of the office B is to be used. In this case, the digit packet sent from the voice packet multiplexer 100 in the office A to that of the office B is the digit packet including the number of the office C (140).

The voice packet multiplexer 100 in the office B temporarily stores the received packet, detects the office number in it, and retrieves a terminating logical channel according to the office number detected. Fixing the terminating logical channel, it retrieves from among the stored packets a call request packet, changes its address field to the terminating logical channel, and sends it to the office C (141). Then, it waits for the arrival of the call accepted packet from the office C. These operations are carried out by the controller 108 using the packet receiver 8, packet storage 10, digit detector 3, logical channel retriever 4, address translator 11 and packet transmitter 7.

Receiving the call accepted packet from the office C (142), the voice packet multiplexer 100 of the office B retrieves from among the stored packets the digit packet of the extension number, and sends it to the office C after changing its address field to the terminating logical channel (143 and 145). This operation is carried out by the controller 108 using the packet receiver 8, packet storage 10, address translator 11 and packet transmitter 7.

Since it is assumed in the present system that the office C has no transit switching function, and hence the office C does not need the office number, its digit packet is discarded in the office B.

Each packet received by the office B from now on is transmitted with its address field translated by the address translator 11 into the terminating logical address if the content of the address field is the originating logical channel, and into the originating logical channel if it is the terminating logical channel, which is referred to as "address translation" from now on.

The sequence in the office C is identical to that in the office B described above in connection with FIG. 6.

Next, the operation of the voice packet multiplexer 100 with the voice transit switching function will be described in more detail with reference to FIG. 8. FIG. 8 is a flowchart illustrating an operation example of the voice transit switching function in accordance with the present invention.

Figure 8:
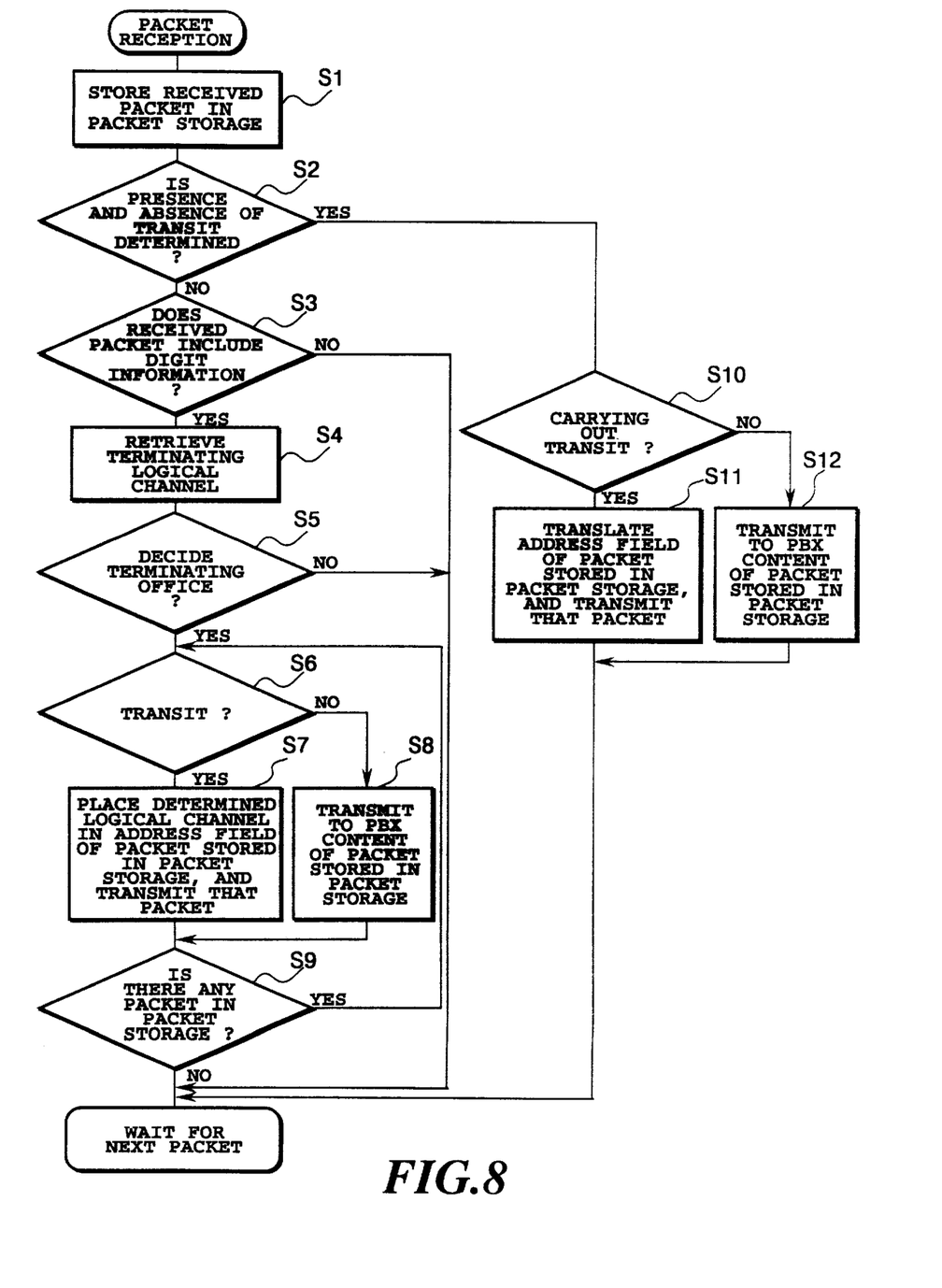
FIG. 8 is a flowchart illustrating an operation of the voice transit switching function of the embodiment.

The flowchart of FIG. 8 illustrates an operation carried out each time the voice packet multiplexer 100 with the transit switching function receives a packet from the packet communication channel. Receiving a packet, the packet receiver 8 stores it in the packet storage 10 at step S1, and makes a decision at step S2 whether the presence and absence of the transit has been determined or not. Until it has been determined, the voice packet multiplexer 100 checks at step S3 whether the digit information is contained in the received packet, and retrieves at step S4 a logical channel for the terminating terminal if the digit information is present. When it receives a call request packet, it waits for the next packet because the digit information is not found in that packet. At step S4, the voice packet multiplexer 100 also checks whether the packet is addressed to a telephone in the present office B. If the terminating office is determined at step S5 as a result of retrieving the logical channel at step S4, it makes a decision at step S6 whether the transit is to be carried out to establish connection to the terminating office. If a decision is made that the transit should be carried out, the originating logical channel is connected with the terminating logical channel. If the terminating office is not determined at step S5, the voice packet multiplexer 100 waits for the arrival of the next packet.

If the voice packet multiplexer 100 makes a decision at step S6 that the transit should be carried out, it changes the address field of the packet stored in the packet storage 10 into the terminating logical channel which is determined at step S4, and transmits it to the packet communication channel at step S7, which is repeated until all the packets stored in the packet storage are finished (step 9). If a decision is made at step S6 that the transit is not required, that is, if the call is addressed to the office B, the content of the packet stored in the packet storage 10 is sent to the PBX 200 of the office B at step S8, which is repeated until a decision is made at step S9 that all the packets stored in the packet storage 10 have been finished. At steps S7 and S8, unnecessary packets such as those associated with the office number are discarded. If the presence or absence of the transit has been decided at step S2, a decision is made at step S10 whether the call is to be relayed or is addressed to the office B. If it is to be relayed, it is transmitted to the packet communication channel at step S11 after the address translation of the address field of the packet stored in the packet storage 10 to the address of the transit. If the call is addressed to the office B, the content of the packet is transmitted to its PBX 200.

Thus, the voice packet multiplexer with the voice transit switching function retrieves the logical channel according to the digits delivered from the PBX, writes the retrieved address in the address field, and stores the originating logical channel during the packet reception. In addition, it extracts the office number from the packet containing the digit information, makes a decision whether the office number indicates that office or another office, and retrieves the terminating logical channel in the case of the another office to make a connection thereto. To carry out the voice transit switching after the terminating logical channel has been established, it translates the address field of the packet to the terminating logical channel if the address field indicates the originating logical channel, and to the originating logical channel if the address field indicates the terminating logical channel, and transmits the packet to the destination.

As described above, the voice packet multiplexer in accordance with the present invention retrieves the logical channel according to the digit information, which enables the voice packet multiplexer to possess the voice transit switching function. This makes it unnecessary for the PBX to have the transit function, reduces the delay time involved in the voice transmission, increases the articulation of the voice, and reduces the number of the channels between the PBX and the voice packet multiplexer.

Thus, the present invention can make an efficient use of the PBX channels, which makes it unnecessary to assign extra logical channels between the voice packet multiplexers when designing the network. This offers an advantage of increasing the voice quality, and reducing the cost involved in installing and operating the system.

The present invention has been described in detail with respect to an embodiment, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A voice packet multiplexer which is connected with a PBX (private branch exchange), carries out packet multiplexing of voices and signals sent from the PBX to be sent to a packet communication channel, and disassembles a packet sent from a packet communication channel into voices and signals to be transmitted to the PBX, said voice packet multiplexer comprising:

digit detector for detecting digits in the signals sent from the PBX;

a logical channel retriever for retrieving a terminating logical channel according to the digits output from the digit detector;

a voice packet assembler for assembling a packet from the terminating logical channel and the voices sent from the PBX;

a signal packet assembler for assembling a packet from the terminating logical channel and the signals sent from the PBX;

a packet storage for storing the packet sent from the packet communication channel;

an originating logical channel detector for detecting an originating logical channel in a packet sent from an originating terminal;

an address translator for translating, when transmitting the packet stored in said packet storage to the packet communication channel, an address field in the packet;

said digit detector detects the digits in the packet sent from the packet communication channel, wherein said packet storage stores, when receiving the packet from the packet communication channel, said packet, wherein when the terminating logical channel has not yet been established, said originating logical channel detector detects the originating logical channel, and said logical channel retriever retrieves the terminating logical channel according to the digits detected by the digit detector, and when the terminating logical channel has been established, said packet stored in said packet storage is transmitted through said packet communication channel, and wherein said address translator translates said address field of the packet into the terminating logical channel when the address field is the originating logical channel, and into the originating logical channel when the address field is the terminating logical channel.

2. A voice packet multiplexer with a transit switching system, comprising:

a packet storage for storing a packet sent from a packet communication channel;

a dial digit detector for detecting dial digits in the signals sent from the packet communication channel;

an originating logical channel detector for detecting an originating logical channel in a packet sent from an originating terminal;

a logical channel retriever for retrieving a terminating logical channel according to the digits output from the dial digit detector; and an address translator for translating, when transmitting the packet stored in said packet storage to the packet communication channel, an address field in the packet.

3. The voice packet multiplexer as claimed in claim 2, wherein said dial digit detector detects said dial digits in the packet sent from the packet sent from the packet communication channel, wherein said packet storage stores, when receiving the packet from the packet communication channel, said packet, wherein when the terminating logical channel has not yet been established, said originating logical channel detector detects the originating logical channel, and said logical channel retriever retrieves the terminating logical channel according to said dial digits detected by said dial digit detector, and when the terminating logical channel has been established, said packet stored in said packet storage is transmitted through said packet communication channel, and wherein said address translator translates said address field of the packet into the terminating logical channel when the address field is the originating logical channel, and into the originating logical channel when the address field is the terminating logical channel.

* * * * *